Patented Oct. 19, 1937

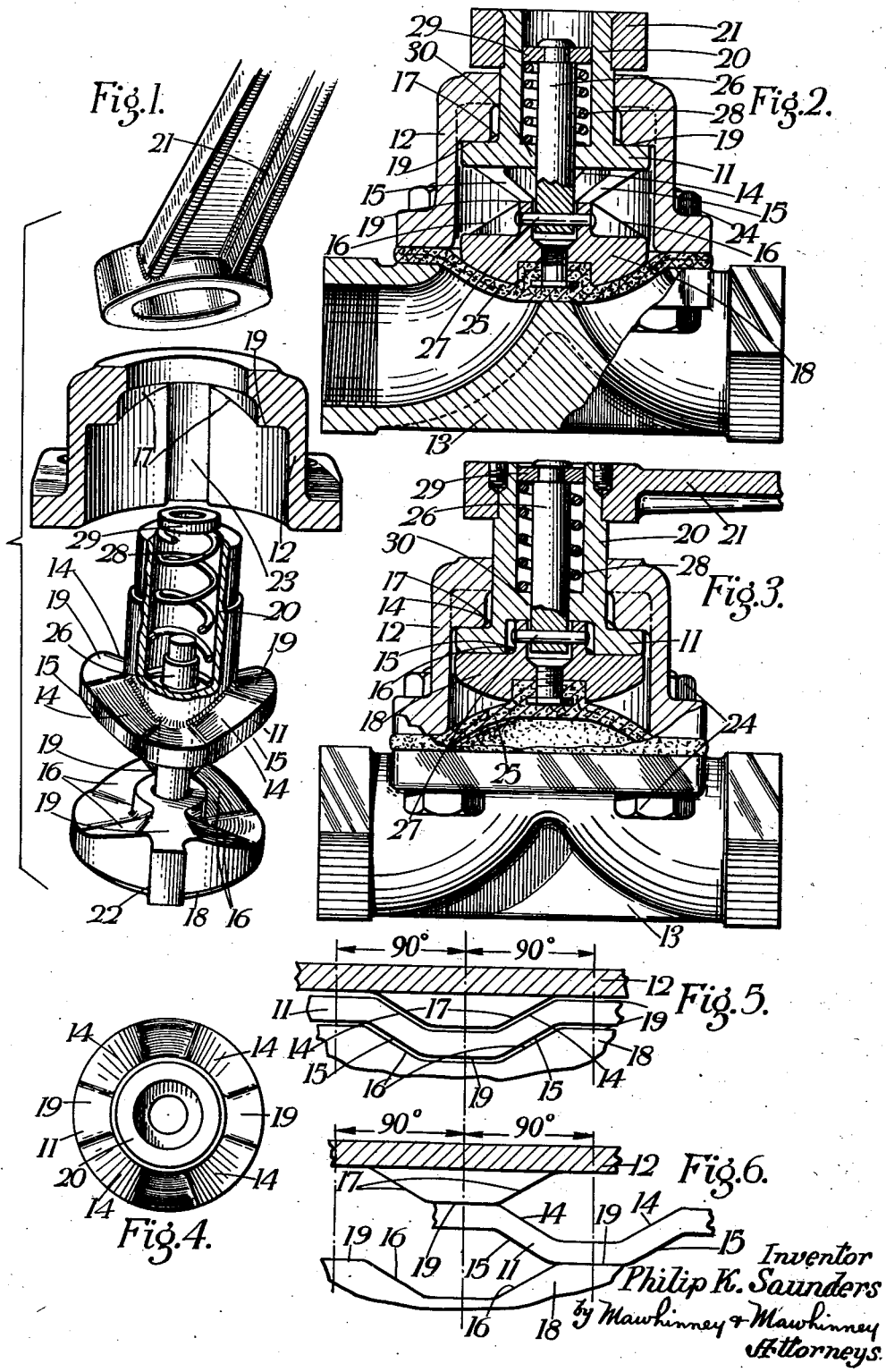

2,096,528

UNITED STATES PATENT OFFICE 2,096,528

DIAPHRAGM VALVE

Philip Keith Saunders, Wolverhampton, England, assignor to Saunders Inventions, Limited, Johannesburg, South Africa Original application August 22, 1935, Serial No. 37,387. Divided and this application March 5, 1936, Serial No. 67,404. In Great Britain August 23, 1934

9 Claims. (Cl. 251—39)

This application is divided out of my co-pending application, Serial No. 37,387, filed 22nd August, 1935, and entitled "Diaphragm valves" which has matured into Patent No. 2,074,240, granted March 16, 1937.

Diaphragm valves have numerous advantages over the plug-cock type of valve, but one advantage that the latter has over the former in ordinary conditions is that it can be quickly moved from the fully-open to the fully-closed position, whereas normally a number of turns of an actuating spindle is necessary for effecting the corresponding operation of a diaphragm valve. Furthermore, when a plug-cock is not provided with any stop the actuating handle can be moved beyond the fully-closed position without any damage being done; but excessive pressure applied to the actuating means of a diaphragm valve, for closing it, will cause damage to the valve, particularly in the case of a small diaphragm valve.

The present invention particularly relates to "streamline" diaphragm valves—that is, to the kind where the body has a substantially straight-through passage intersected by a shallow barrier extending across the passage and having a concave face which forms a seating for the diaphragm, the base wall of the passage curving up smoothly to the concave face on each side of the barrier.

The main object of the present invention is to provide improvements in diaphragm valves by which the above-mentioned drawbacks of diaphragm valves will be remedied.

A further object of the invention is to provide a diaphragm valve which is actuated through a plurality of cam devices arranged in series, i. e., acting one through another.

According to a still further object of the invention, the diaphragm of a diaphragm valve is actuated through an intermediate member formed on opposite faces with cams co-acting, respectively, with the valve body, or with a cover therefor, and with a compressor for the diaphragm; the cams having flats adapted for holding the compressor with the diaphragm in the closed position.

In the accompanying drawing:—

Figure 1 is a perspective "exploded" view of one form of actuating mechanism, according to the invention, suitable for a relatively small valve;

Figure 2 is a part-sectional elevation of a valve fitted with the actuating mechanism of Figure 1, the valve being shown closed;

Figure 3 is a substantially similar view of the valve when open;

Figure 4 is a plan of the intermediate member; and

Figures 5 and 6 are diagrams illustrating the position of the intermediate member relative to the cover and compressor when the valve is open and closed, respectively.

In the construction illustrated, which is eminently suitable for relatively small "streamline" diaphragm valves and with which the overall dimensions of the valve are not materially increased, use is made of an intermediate member in the form of an annulus 11 disposed within a cylindrical portion of the cover 12 for the valve body 13. On each of its opposite faces are provided two diametrically-opposite rising cams with smooth, inclined surfaces 14, 14 and 15, 15. Corresponding diametrically-opposite inclined cam surfaces 16 and 17 are provided on the adjacent surfaces of a compressor 18 for the diaphragm and of the far end of the cover, respectively. The extremities of all the cam surfaces are flattened, as shown at 19. The intermediate member is, in fact, like a wavy ring with a central axial flange 20. The cams on one surface are in series with those on the opposite surface.

In the open position of the valve (Figure 3) the inclined cam surfaces 15, 14, on the intermediate member rest against the corresponding inclinations 16, 17 on the compressor and the cover, respectively, as shown in Figure 5, when the compressor is as near that end of the cover as possible. On twisting the intermediate member—as by means of a handle 21 fast on the shank portion 20 of the member—it is itself forced axially away from the adjacent end of the cover and at the same time the compressor is forced axially away from the intermediate member, as the various inclined surfaces ride up one another—the compressor being slidably guided and held against rotation in the cover by means of the lugs 22 sliding in the grooves 23 of the cover. When the parts have been fully expanded in this manner the appropriate cam flats 19 are in engagement and the compressor is thus held in this position, in which the diaphragm is fully closed, as shown by Figures 2 and 6.

The axial distance between the flats 19 of the cams on the opposite faces of the intermediate member must be accurately arranged to ensure that the diaphragm will be fully closed in the above conditions. Fine adjustment can be effected by tightening the nuts or screws 24 by which the cover clamps the diaphragm 25 against the valve body.

Conveniently, the shank 20 of the intermediate member is bored to freely receive a spindle 26 pinned at 27 or otherwise connected to the adjacent face of the compressor. A compression spring 28 may be interposed between a head 29 on this spindle and an inturned flange 30 of the intermediate member, so that at all times the compressor will be biased towards the intermediate member.

The inclinations of the cam surfaces are sufficiently "easy" to allow of operation in this manner from the fully-open to the mid-point of the fully-closed position when the intermediate member is turned through approximately one quarter revolution. If the latter be turned farther than the full-closing position, as it can be, no damage will be done to the diaphragm but the valve will just be re-operated towards the open position. Closing can be effected by rotation of the intermediate member in either direction. The fully-closed position of the diaphragm is maintained, in this construction, for a handle movement of over 30°—in point of fact, for a movement of nearly 90°, each of the four flats 19 extending for nearly 45° about the axis of the intermediate member. Thus, when the valve is fully open (Figure 5), it can be brought to the fully-closed position by rotation of the intermediate member through about 45° and it will be maintained fully closed on further rotation of the intermediate member as long as such further rotation does not exceed an angle of nearly 90°.

Thus, by means of the invention the diaphragm of a "streamline" valve can be moved from the fully-closed to the fully-open position, and vice versa, very quickly and easily, and held in the closed position.

What I claim as my invention and desire to secure by Letters Patent of the United States is:—

1. In a diaphragm valve, a casing having a seat, a diaphragm for cooperating with said seat, an intermediate actuating member having an annular portion of wavy formation, the casing of the valve having a corresponding wavy surface to co-act with one face of the intermediate member when the latter is rotated, a compressor for the diaphragm having a wavy surface to co-act with the other face of the intermediate member when the latter is rotated, means for holding the compressor against rotation, and means biasing the compressor towards the intermediate member, said latter means including a spindle connected to the compressor and extending into the interior of the intermediate member, an abutment carried by the spindle in the interior of the intermediate member, an internal shoulder formed in the intermediate member, and a compression spring acting between the abutment and the shoulder, said wavy annular portion of the intermediate member on rotation of said intermediate member reacting against the wavy surfaces of the valve casing and compressor to cause movement of the diaphragm towards its seat in opposition to the action of said spring.

2. In a diaphragm valve, a casing having a seat, a diaphragm for cooperating with said seat, an intermediate actuating member having an annular portion of wavy formation and having a cylindrical portion slidingly and rotatively journalled in the casing of the valve, the casing having a corresponding wavy surface to co-act with one face of the intermediate member when the latter is rotated, a compressor for the diaphragm having a wavy surface to co-act with the other face of the intermediate member when the latter is rotated, means for holding the compressor against rotation, and a compression spring disposed in the interior of said cylindrical portion and acting to bias the intermediate member and compressor towards one another, said wavy annular portion of the intermediate member on rotation of said intermediate member reacting against the wavy surfaces of the valve casing and compressor to cause movement of the diaphragm towards its seat in opposition to the action of said spring.

3. In a diaphragm valve, a casing having a seat, a diaphragm for cooperating with said seat, an intermediate actuating member having an annular portion of wavy formation, the casing having a corresponding wavy surface to co-act with one face of the intermediate member when the latter is rotated, a compressor for the diaphragm having a wavy surface to co-act with the other face of the intermediate member when the latter is rotated, and means for holding the compressor against rotation, yieldable means to cause the movement of the diaphragm away from its seat and the movement of the compressor toward the wavy surface of the valve casing when the intermediate member is rotated to a position where its trough portions are occupied by the high points of the wavy surfaces of the casing and compressor, said intermediate member being rotatable to a position where the high points of its wavy annular portion ride out on the high points of the wavy surfaces of the casing and compressor to cause movement of the diaphragm towards its seat.

4. In a diaphragm valve, a casing having a seat, a diaphragm for cooperating with said seat, an intermediate actuating member having a portion co-axial with the diaphragm and extending through an opening in the casing of the valve to the exterior thereof, the casing being a divided one, a part of which serves for clamping the edge of the diaphragm against another part, an actuating member secured to said co-axial portion externally of the casing for rotating the intermediate member, the intermediate member having in the interior of the casing an annular portion of wavy formation, a compressor for the diaphragm which is held in the casing against rotation, and corresponding wavy surfaces formed in the casing and on the compressor, respectively, to co-operate with opposite faces of the wavy annular portion of the intermediate member, said intermediate member when rotated to one position where the high points of its wavy annular portion ride out on the high points of the wavy surfaces of the valve casing and compressor causing movement of the diaphragm against its seat, and yieldable means to cause movement of the compressor and its diaphragm away from the seat when the intermediate member is moved to a position where its high points are presented to the trough of the wavy surfaces of the valve casing and compressor.

5. In a diaphragm valve, a casing having a seat, a diaphragm for cooperating with said seat, an intermediate actuating member having a portion co-axial with the diaphragm and extending through an opening in the casing of the valve to the exterior thereof, an actuating member secured to said co-axial portion externally of the casing for rotating the intermediate member, the intermediate member having in the interior of the casing an annular portion of wavy formation, a compressor for the diaphragm which is held in the casing against rotation, corresponding wavy surfaces formed in the casing and on the compressor, respectively, to co-operate with opposite faces of the wavy annular portion of the intermediate member, and a spring acting between the intermediate member and compressor to bias these axially towards one another, said wavy annular portion of the intermediate member on rotation of said intermediate member reacting against the wavy surfaces of the valve casing and compressor to cause movement of the diaphragm towards its seat in opposition to the action of said spring.

6. In a diaphragm valve, a casing having a seat, a diaphragm for cooperating with said seat, an intermediate actuating member having a cylindrical portion co-axial with the main axis of the diaphragm and rotatively and slidingly journalled in an opening in the casing of the valve, an actuating member secured to the cylindrical portion externally of the casing for rotating the intermediate member, the intermediate member also having in the interior of the casing an annular portion of wavy formation, a compressor for the diaphragm which is held in the casing against rotation, and corresponding wavy surfaces formed in the casing and on the compressor, respectively, to co-operate with opposite faces of the wavy annular portion of the intermediate member said intermediate member when rotated to one position where the high points of its wavy annular portion ride out on the high points of the wavy surfaces of the valve casing and compressor causing movement of the diaphragm against its seat, and yieldable means to cause movement of the compressor and its diaphragm away from the seat when the intermediate member is moved to a position where its high points are presented to the troughs of the wavy surfaces of the valve casing and compressor.

7. In a diaphragm valve, a casing having a seat, a diaphragm for cooperating with said seat and an intermediate actuating member having a hollow portion co-axial with the diaphragm and extending through an opening in the casing of the valve to the exterior thereof, an actuating member secured to said co-axial portion externally of the casing for rotating the intermediate member, the intermediate member having in the interior of the casing an annular portion of wavy formation, a compressor for the diaphragm which is slidably held in the casing against rotation, corresponding wavy surfaces formed in the casing and on the compressor, respectively, to co-operate with opposite faces of the wavy annular portion of the intermediate member, and a spring disposed in the interior of said co-axial portion and acting to bias the intermediate member and compressor axially towards one another, said wavy annular portion of the intermediate member on rotation of said intermediate member reacting against the wavy surfaces of the valve casing and compressor to cause movement of the diaphragm towards its seat in opposition to the action of said spring.

8. In a diaphragm valve, a casing with a cam face formed on the inside thereof, a seat in said casing, a diaphragm for cooperation with said seat, a compressor connected with the diaphragm and axially slidable in said casing, said compressor having a cam face similar to and disposed towards that of said casing, and an intermediate rotatable member having oppositely-arranged cam faces to co-act with those of said casing and compressor, said cam faces including raised and depressed portions, the raised portions of the rotatable member in one angular position of that member lying within the depressed portions of the cam faces of the casing and compressor to permit movement of the diaphragm away from its seat, the raised portions of the rotatable member in other angular positions of said member riding out on the raised portions of the cam faces of the casing and compressor to move the compressor and its diaphragm toward the seat.

9. In a diaphragm valve, according to claim 8, the cam faces providing two raised and two depressed flats, each flat covering a distance represented by about 45°.

PHILIP KEITH SAUNDERS.